(No Model.)
E. P. BURNS.
MACHINE FOR POINTING RAKE TEETH.
No. 374,342. Patented Dec. 6, 1887.
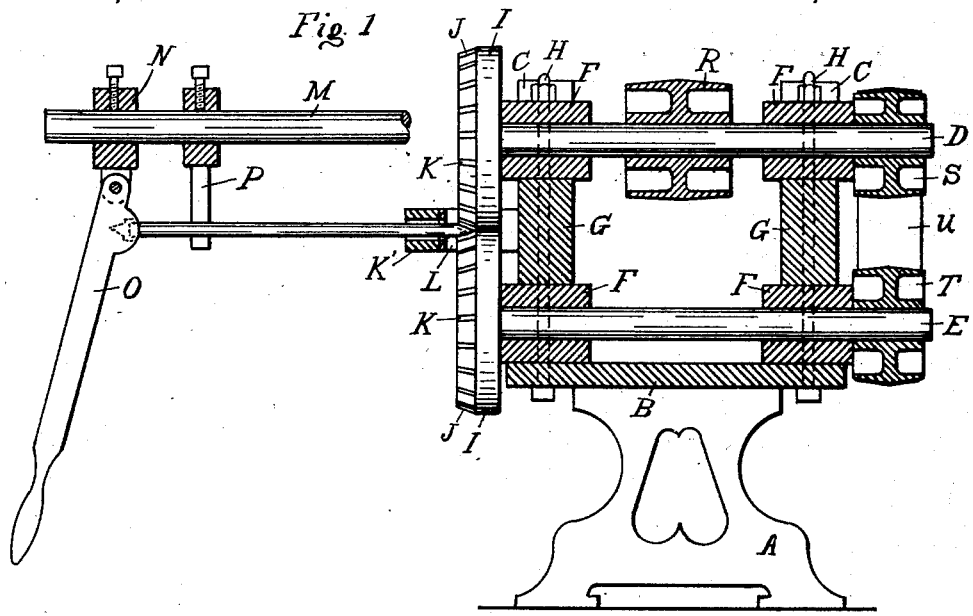
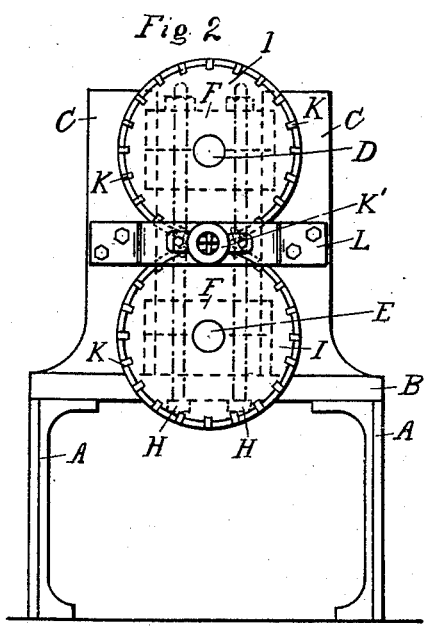
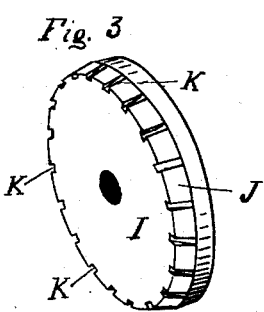
Witnesses:
P. M. Hulbert
Jas. Whittemore
Inventor:
Elijah P. Burns
By Adolph Barthel
Atty.

UNITED STATES PATENT OFFICE.

ELIJAH P. BURNS, OF DETROIT, MICHIGAN.

MACHINE FOR POINTING RAKE-TEETH.

SPECIFICATION forming part of Letters Patent No. 374,342, dated December 6, 1887.

Application filed July 25, 1887. Serial No. 245,192. (No model.)

*To all whom it may concern:*

Be it known that I, ELIJAH P. BURNS, a citizen of the United States, residing at Detroit, in the county of Wayne and State of Michigan, have invented certain new and useful Improvements in Machines for Pointing Rake-Teeth, of which the following is a specification, reference being had therein to the accompanying drawings.

This invention relates to new and useful improvements in machines for pointing rake-teeth and other similar articles.

The object of the invention is to carry out the operation by a process of rolling, all as more fully hereinafter described, and shown in the accompanying drawings, wherein—

Figure 1 is a vertical longitudinal central section of my machine as it appears in operation upon a rake-tooth. Fig. 2 is a front view of the machine, and Fig. 3 is a detached perspective view of one of the rollers.

A are suitable standards or legs which support a table or bed-plate, B, which supports the vertical standards C, arranged in pairs, as shown.

D and E are two parallel shafts, one vertically above the other, and journaled in boxes F, which are held in position by the standards C. The boxes of the upper shaft are made vertically adjustable in relation to the boxes of the lower shaft. This I preferably accomplish by supporting the lower boxes upon the bed-plate and interposing between them and the upper boxes suitable blocks, G, of proper height to support the upper boxes, and then bolting all the parts together, as shown, by means of vertical bolts H.

By the use of shims interposed between the boxes the distance of the upper boxes from the lower boxes may be increased or diminished at will to accomplish the desired adjustment.

Shafts D and E project through the boxes in the front side of the machine, and are provided there with two solid shafting rollers or wheels, I. These wheels or rolls are formed with the bevel J upon their faces, so as to form at the nearest point of approach between the two wheels a V-shaped opening corresponding with the desired shape of the point of the tooth.

The bevel J on the wheels I is formed in a peculiar manner, as shown more fully in Fig. 3, wherein K are a series of shallow recesses or indentations placed at equal distances apart around the circumference of the wheel, and which conform to the general shape of the bevel.

Directly in front of the point of nearest approach between the two wheels is placed a guide-tube, K', which is removably secured in position in any suitable manner to the cross-brace L, which is supported upon the front standards, or in any suitable manner. The object of removably securing the guide-tube K' is to permit of exchanging it readily for tubes of lesser or larger bore to admit different sizes of rods or teeth.

At the front of the machine is secured, in any suitable manner, the fixed guide-bar M, and upon this is adjustably secured the sleeve N, to which the hand-lever O is fulcrumed. This hand-lever is provided near its fulcrum with a step, which is in axial line with the guide-tube K' and serves to receive the rear end of the rake-tooth, as shown.

P is a rest adjustably secured upon the guide-bar M.

Motion is communicated to the machine by means of the pulley R upon the upper shaft, D, and from there it is conveyed to the lower shaft, E, by means of the pulleys S T and suitable cross-belt, U, or in any other desired manner.

In practice, the parts being arranged as described and shown, the operation of pointing rake-teeth is as follows: The tooth, after having been suitably heated at the end to be pointed, is brought in the position shown in Fig. 1, wherein its rear end is shown inserted into the step on the lever and its heated front end projected through the guide-tube between the rolls. Motion being applied to the machine, the operator takes hold of the hand-lever O, and, drawing it toward the front, forces the heated end of the rake-tooth gradually more and more into the rolls until the point is formed. During this operation the tooth itself will be forced to revolve, owing to the peculiar construction of the bevel-face of the rolls, and I take advantage of this to remove at the same operation any burr which might exist at the rear end of the tooth by forming the step of steel of suitable hardness and shape to perform this result.

It will be noticed that I have provided wherever it is necessary suitable adjustments to adapt the machine to operate upon teeth of various sizes and lengths.

While I have shown the hand-lever, guide-bar, and rest in a vertical plan, I did so for the purpose of better illustrating the parts. In practice I preferably arrange these parts in a horizontal plan, in which the operation of the lever becomes more convenient to the operator.

I lay particular importance upon the peculiar construction of the bevel-face of the rolls, as it will be seen that it would be impossible to form a sharp point on a rod or tooth of small diameter without introducing mechanical means to revolve the tooth or rod at the same time. By my construction the tooth or rod is revolved as a necessary result of the indentations on the bevel-face of the rolls. I do not intend to limit myself as regards the number or form of these indentations; but they should be of sufficient number to give a continuous motion to the tooth or rod.

While I have described my machine for the specific purpose of pointing rake-teeth, it is obvious that my invention as embodied in this machine may be used for numerous other like purposes to the one described.

What I claim as my invention is—

1. In a machine for the purposes described, the combination of two shaping rolls or wheels provided with plain contracting peripheries and with indentations upon their beveled operating-faces, substantially as and for the purpose described.

2. In a machine for the purpose described, the combination, with two revolving shaping rolls or wheels, of a guide-tube arranged in relation to said rolls to guide the end of the tooth or rod into the shaping-rolls, and a hand-lever provided with a step arranged to receive the rear end of the rod or tooth, all arranged and operated substantially as and for the purpose described.

3. In a machine for the purpose described, the combination of upper and lower indented shaping rolls or wheels I, the guide-tube K', the guide-bar M, the feed-lever O, and rest P, all arranged to operate substantially as and for the purpose described.

In testimony whereof I affix my signature, in presence of two witnesses, this 11th day of July, 1887.

ELIJAH P. BURNS.

Witnesses:
JAS. WHITTEMORE,
H. S. SPRAGUE.